US011477819B2

United States Patent
Ljung et al.

(10) Patent No.: US 11,477,819 B2
(45) Date of Patent: Oct. 18, 2022

(54) ELECTRONIC DEVICE THAT CONDUCTS LISTEN BEFORE TALK OPERATION AS PART OF WIRELESS RADIO COMMUNICATIONS AND METHOD THEREFOR

(71) Applicant: Sony Group Corporation, Tokyo (JP)

(72) Inventors: Rickard Ljung, Helsingborg (SE); Kåre Agardh, Rydebäck (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/629,075

(22) PCT Filed: Aug. 10, 2017

(86) PCT No.: PCT/US2017/046216
§ 371 (c)(1),
(2) Date: Jan. 7, 2020

(87) PCT Pub. No.: WO2019/032110
PCT Pub. Date: Feb. 14, 2019

(65) Prior Publication Data
US 2020/0178298 A1 Jun. 4, 2020

(51) Int. Cl.
*H04W 16/14* (2009.01)
*H04W 74/08* (2009.01)
(Continued)

(52) U.S. Cl.
CPC ...... *H04W 74/0808* (2013.01); *H04B 17/318* (2015.01); *H04W 4/70* (2018.02); *H04W 8/22* (2013.01); *H04W 24/10* (2013.01)

(58) Field of Classification Search
CPC ..... H04W 74/0808; H04W 4/70; H04W 8/22; H04W 24/10; H04B 17/318
See application file for complete search history.

(56) References Cited

U.S. PATENT DOCUMENTS 9,565,605 B1 * 2/2017 Yang ................ H04W 36/0079
11,096,215 B2 * 8/2021 Lee .................. H04W 72/0453
(Continued)

FOREIGN PATENT DOCUMENTS

WO 2017054438 A1 4/2017

OTHER PUBLICATIONS

LG Electronics, "LBT schemes in LAA UL", R1-160630 UL LBT, 3GPP TSG RAN WG1 meeting #84, St. Julian's, Malta, Feb. 14, 2016, 10 pages.
(Continued)

Primary Examiner — Dai Phuong
(74) Attorney, Agent, or Firm — Tucker Ellis LLP (57) ABSTRACT

A method and electronic device for conducting wireless radio communications are disclosed. Conducting the wireless radio communications includes determining that the electronic device has a reason to communicate over a wireless radio interface and conducting listen before talk with a listen before talk receiver in response to the determining that the electronic device has the reason to communicate over the wireless radio interface. Upon detecting, through the listen before talk, that wireless spectrum for the wireless radio interface is available for conducting the wireless radio communications, activating a radio access transceiver and carrying out the wireless radio communications over the wireless radio interface using the available wireless spectrum.

19 Claims, 3 Drawing Sheets (51) Int. Cl.
*H04B 17/318* (2015.01)
*H04W 4/70* (2018.01)
*H04W 8/22* (2009.01)
*H04W 24/10* (2009.01)

(56) References Cited

U.S. PATENT DOCUMENTS

| | | | |
|---|---|---|---|
| 2005/0130713 A1* | 6/2005 | Simpson | H04W 52/0225 |
| | | | 455/574 |
| 2014/0185497 A1* | 7/2014 | Wolf | H04W 28/26 |
| | | | 370/294 |
| 2015/0382374 A1 | 12/2015 | Bhorkar | |
| 2017/0078894 A1* | 3/2017 | Lee | H04W 24/02 |
| 2018/0070252 A1* | 3/2018 | Gupta | H04W 74/0808 |
| 2018/0242234 A1* | 8/2018 | Semaan | H04W 48/18 |
| 2018/0255579 A1* | 9/2018 | Shimomura | H04W 74/0833 |
| 2018/0310193 A1* | 10/2018 | Bhorkar | H04B 7/0632 |
| 2019/0261413 A1* | 8/2019 | Fodor | H04W 74/0808 |

OTHER PUBLICATIONS

Mihaela Beluri et al., "Mechanisms for LTE coexistence in TV white space", Dynamic Spectrum Access Networks (DYSPAN), 2012 IEEE International Symposium on, IEEE, Oct. 16, 2012, p. 317-326.
Huawei et al., "DL LBT Operation", R2-153314, 3GPP TSG-RAN WG2 Meeting #91, Beijing, China, Aug. 23, 2015, 6 pages.
International Search Report and Written Opinion from corresponding Patent Application No. PCT/US2017/046216, dated Apr. 17, 2018, 15 pages.

* cited by examiner

ELECTRONIC DEVICE THAT CONDUCTS LISTEN BEFORE TALK OPERATION AS PART OF WIRELESS RADIO COMMUNICATIONS AND METHOD THEREFOR

TECHNICAL FIELD OF THE INVENTION

The technology of the present disclosure relates generally to electronic devices and, more particularly, to a system and method for conducting a listen before talk operation to check availability of wireless spectrum for use in carrying out wireless radio communications.

BACKGROUND

Spectrum sharing is thought of as one of the most viable ways of improving the amount of spectrum available to wireless networks and other radio devices for conducting wireless communications. But regulations and/or network policies hold that radios using shared spectrum, even in a permitted area, must not cause impermissible interference. Impermissible interference may depend on the spectrum of interest. For instance, television band devices (TVBDs) that use unlicensed televisions channels that are interleaved with licensed television channels must be tolerant of other TVBDs that use the same spectrum. For other unlicensed spectrum, or even licensed spectrum, a radio device may not transmit during the transmissions made by other radio device.

To address potential contention issues on shared spectrum, listen before talk (LBT) is a common technique used by a radio device that desires to make use of wireless spectrum prior to carrying out wireless radio communications. This approach may ensure that that the target wireless spectrum is available before transmitting. Availability depends on the situation. For instance, for TV whitespaces, a channel is available if it is unused by a licensed transmitter and, at least in the U.S., the radio device has a channel authorization from an authorization server to use the channel. In other situations, spectrum is considered available if it is unoccupied (e.g., not in use) by another transmitter. Therefore, many listen before talk routines determine if the target wireless spectrum is silent for a minimum time duration before the radio device is permitted to transmit. Determining that target wireless spectrum is silent may be made, for example, by measuring the energy level of any signal and noise over a certain bandwidth, and concluding that the target wireless spectrum is silent if the detected energy level is below a certain threshold.

As spectrum sharing devices start to increase in number, the devices may spend more and more time in listen before talk routines. These operations consume electrical power to operate the device's transceiver to detect energy and/or particular signals on the target wireless spectrum. Many wireless radio devices, including those that use machine-type protocols to communicate as part of the "internet of things" (IoT), rely on small rechargeable batteries for operation. The charge on these batteries may be drained by conducting listen before talk routines.

SUMMARY

The disclosed approach makes use of a dedicated, very low current consumption radio frequency (RF) listen before talk receiver to detect traffic on target wireless spectrum. This approach will assist in avoiding traffic collisions and contention on shared spectrum. The approach also may reduce electricity consumption for listen before talk operations of electronic devices and, for battery powered devices, improve battery life between charges. Also, when a device is capable of operating using more than one radio access technology in the same or different wireless spectrum, the use of the disclosed listen before talk approach may facilitate additional energy savings by determining an optimum transceiver to use and waking up only that transceiver from multiple options.

According to one aspect of the disclosure, a method of carrying out wireless radio communications with an electronic device includes determining that the electronic device has a reason to communicate over a wireless radio interface; conducting listen before talk with a listen before talk receiver in response to the determining that the electronic device has the reason to communicate over the wireless radio interface; detecting, through the listen before talk, that wireless spectrum for the wireless radio interface is available for conducting the wireless radio communications; and in response to the detecting of the available wireless spectrum, activating a radio access transceiver and carrying out the wireless radio communications over the wireless radio interface with the radio access transceiver using the available wireless spectrum.

According one embodiment of the method, the conducting the listen before talk includes activating the listen before talk receiver from an off or idle state.

According one embodiment of the method, the listen before talk includes listening for activity on the wireless spectrum and detecting if the wireless spectrum is occupied.

According one embodiment of the method, wherein the listen before talk includes: listening for activity on the wireless spectrum; detecting that the wireless spectrum is occupied; and listening again for activity on the wireless spectrum.

According one embodiment of the method, the wireless spectrum is occupied if detected energy on the wireless spectrum is greater than a predetermined threshold.

According one embodiment of the method, the wireless spectrum is occupied if a preamble associated with a wireless radio communication protocol is detected.

According one embodiment of the method, the wireless spectrum is available if detected energy on the wireless spectrum is less than a predetermined threshold.

According one embodiment of the method, the wireless spectrum is available if a preamble associated with a wireless radio communication protocol is not detected.

According one embodiment of the method, listen before talk is carried out for each of multiple radio access technologies, and wherein the electronic device comprises multiple radio access transceivers, each radio access transceiver configured to conduct communications respectively under one or more of the radio access technologies, and the activating the radio access transceiver includes activating the radio access transceiver associated with wireless spectrum first detected as available.

According one embodiment of the method, listen before talk is carried out for each of multiple radio access technologies, and wherein the electronic device comprises multiple radio access transceivers, each radio access transceiver configured to conduct communications respectively under one or more of the radio access technologies, and the activating the radio access transceiver includes activating the radio access transceiver associated with available wireless spectrum having a highest priority.

According one embodiment of the method, the wireless radio communication carried out by the radio access transceiver is machine-type communication.

According to another aspect of the disclosure, an electronic device configured to carry out wireless radio communications includes a listen before talk receiver; a radio access transceiver that carries out the wireless radio communications; and a controller configured to: determine that the electronic device has a reason to communicate over a wireless radio interface; conduct listen before talk with the listen before talk receiver in response to the determining that the electronic device has the reason to communicate over the wireless radio interface; detect, through the listen before talk, that wireless spectrum for the wireless radio interface is available for conducting the wireless radio communications; and in response to the detecting of the available wireless spectrum, activate the radio access transceiver and carry out the wireless radio communications over the wireless radio interface with the radio access transceiver using the available wireless spectrum.

According one embodiment of the electronic device, the listen before talk includes activating the listen before talk receiver from an off or idle state.

According one embodiment of the electronic device, the listen before talk includes listening for activity on the wireless spectrum and detecting if the wireless spectrum is occupied.

According one embodiment of the electronic device, the listen before talk includes: listening for activity on the wireless spectrum; detecting that the wireless spectrum is occupied; and listening again for activity on the wireless spectrum.

According one embodiment of the electronic device, the wireless spectrum is occupied if detected energy on the wireless spectrum is greater than a predetermined threshold.

According one embodiment of the electronic device, the wireless spectrum is occupied if a preamble associated with a wireless radio communication protocol is detected.

According one embodiment of the electronic device, the wireless spectrum is available if detected energy on the wireless spectrum is less than a predetermined threshold.

According one embodiment of the electronic device, the wireless spectrum is available if a preamble associated with a wireless radio communication protocol is not detected.

According one embodiment of the electronic device, listen before talk is carried out for each of multiple radio access technologies, and wherein the electronic device comprises multiple radio access transceivers, each radio access transceiver configured to conduct communications respectively under one or more of the radio access technologies, and the activating the radio access transceiver includes activating the radio access transceiver associated with wireless spectrum first detected as available.

According one embodiment of the electronic device, listen before talk is carried out for each of multiple radio access technologies, and wherein the electronic device comprises multiple radio access transceivers, each radio access transceiver configured to conduct communications respectively under one or more of the radio access technologies, and the activating the radio access transceiver includes activating the radio access transceiver associated with available wireless spectrum having a highest priority.

According one embodiment of the electronic device, the wireless radio communication carried out by the radio access transceiver is machine-type communication.

DETAILED DESCRIPTION OF EMBODIMENTS

Introduction

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for conducting wireless radio communications that include a listen before talk operation with low power consumption. The listen before talk operation may be conducted with a low-power listen before talk receiver, which may be implemented in similar manner to a wake-up receiver but for outbound transmissions from the electronic device rather than for inbound signal reception. The disclosed listen before talk techniques may be carried out in an automated manner by the electronic device.

System Architecture

Figure 1:
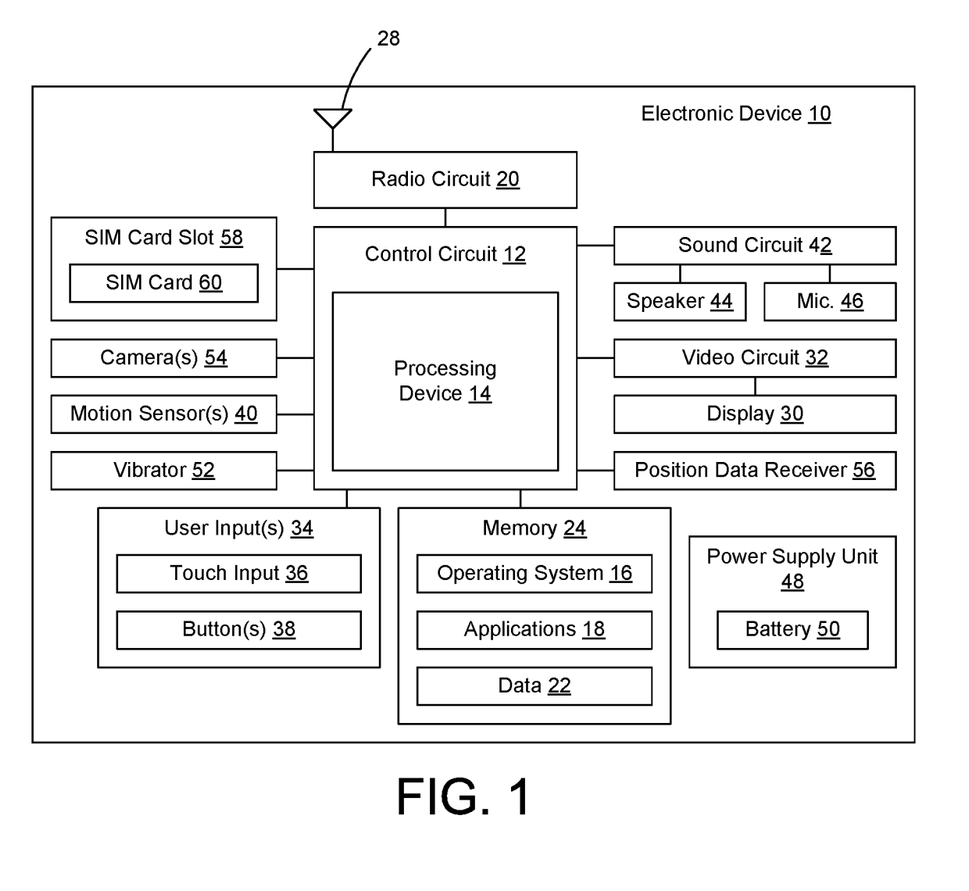
FIG. 1 is a schematic block diagram of an electronic device that conducts listen before talk operations as part of wireless radio communications.

FIG. 1 is a schematic diagram of an exemplary system for implementing the disclosed techniques. It will be appreciated that the illustrated system is representative and other systems may be used to implement the disclosed techniques.

The system includes an electronic device 10. The electronic device 10 of the illustrated embodiment is a mobile radiotelephone (a "smartphone"), which also may be referred to as a user equipment or UE. It will be understood that the disclosed techniques may be carried out by other types of electronic devices. Exemplary alternative electronic devices 10 include, but are not limited to, a tablet computing device, a computer, a device that uses machine-type communications, machine-to-machine (M2M) communications or device-to-device (D2D) communication (e.g., a sensor, a machine controller, an appliance, etc.), a camera, a media player, or any other device that conducts listen before talk operations.

As will be described, the electronic device 10 is configured to carry out the logical functions that are described herein. Referring to the exemplary embodiment of a mobile telephone, the electronic device 10 includes a control circuit 12 that is responsible for overall operation of the electronic device 10, including controlling the electronic device 10 to carry out the operations described in greater detail below. The control circuit 12 includes a processor 14 that executes code, such as an operating system 16 and various applications 18. The functions described in this disclosure document may be embodied as part of the operating system 16 or as part of dedicated logical operations of a radio circuit 20. The logical functions and/or hardware of the electronic device 10 may be implemented in other manners depending on the nature and configuration of the electronic device 10. Therefore, the illustrated and described approaches are just examples and other approaches may be used including, but not limited to, the control circuit 12 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The operating system 16, the applications 18, and stored data 22 (e.g., data associated with the operating system 16, the applications 18, and user files), are stored on a memory 24. The operating system 16 and applications 18 are embodied in the form of executable logic routines (e.g., lines of code, software programs, etc.) that are stored on a non-transitory computer readable medium (e.g., the memory 24) of the electronic device 10 and are executed by the control circuit 12. The functions described herein may be thought of as methods that are carried out by the electronic device 10.

The processor 14 of the control circuit 12 may be a central processing unit (CPU), microcontroller, or microprocessor. The processor 14 executes code stored in a memory (not shown) within the control circuit 12 and/or in a separate memory, such as the memory 24, in order to carry out operation of the electronic device 10. The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 12. The memory 24 may exchange data with the control circuit 12 over a data bus. Accompanying control lines and an address bus between the memory 24 and the control circuit 12 also may be present. The memory 24 is considered a non-transitory computer readable medium.

The electronic device 10 includes communications circuitry that enables the electronic device 10 to establish various wireless communication connections. In the exemplary embodiment, the communications circuitry includes a radio circuit 20. The radio circuit 20 includes one or more radio frequency transceivers 26 (FIG. 2) and at least one antenna assembly 28 associated with each transceiver 26. Depending on the radio access technology (or technologies) that each transceiver is configured to carry out, an individual antenna assembly 28 may be shared by more than one transceiver 26.

Figure 2:
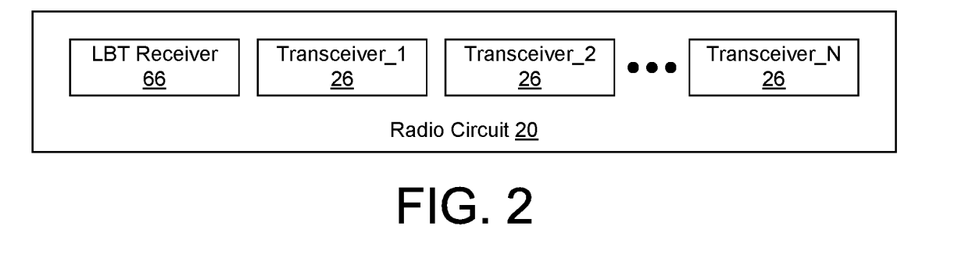
FIG. 2 is a schematic block diagram of a radio circuit for the electronic device of FIG. 1.

Each transceiver 26 is fully operational to conduct wireless radio communications according to a corresponding radio access technology (RAT). Power consumption by each transceiver 26 is commensurate with the implementation of the transceiver 26.

As will be appreciated, the electronic device 10 may have one transceiver 26 for implementing one radio access technology or may be a multi-mode device capable of communicating using more than one standard or protocol, over more than one radio access technology and/or over more than one radio frequency band. Thus, the radio circuit 20 represents one or more than one radio transceiver (also referred to as a modem in some cases), one or more than one antenna, tuners, impedance matching circuits, and any other components needed for the various supported frequency bands and radio access technologies. Exemplary network access technologies supported by the radio circuit 20 of the representative mobile telephone include cellular circuit-switched network technologies and packet-switched network technologies, including but not limited WiFi. The radio circuit 20 further represents any radio transceivers and antennas used for local wireless communications directly with another electronic device, such as over a Bluetooth interface and/or over a body area network (BAN) interface.

The electronic device 10 further includes a display 30 for displaying information to a user. The display 30 may be coupled to the control circuit 12 by a video circuit 32 that converts video data to a video signal used to drive the display 30. The video circuit 32 may include any appropriate buffers, decoders, video data processors, and so forth.

The electronic device 10 may include one or more user inputs 34 for receiving user input for controlling operation of the electronic device 10. Exemplary user inputs 34 include, but are not limited to, a touch sensitive input 36 that overlays or is part of the display 30 for touch screen functionality, and one or more buttons 38. Other types of data inputs may be present, such as one or more motion sensors 40 (e.g., gyro sensor(s), accelerometer(s), etc.).

The electronic device 10 may further include a sound circuit 42 for processing audio signals. Coupled to the sound circuit 42 are a speaker 44 and a microphone 46 that enable audio operations that are carried out with the electronic device 10 (e.g., conduct telephone calls, output sound, capture audio, etc.). The sound circuit 42 may include any appropriate buffers, encoders, decoders, amplifiers, and so forth.

The electronic device 10 may further include a power supply unit 48 that includes a rechargeable battery 50. The power supply unit 48 supplies operational power from the battery 50 to the various components of the electronic device 10 in the absence of a connection from the electronic device 10 to an external power source.

The electronic device 10 also may include various other components. For instance, the electronic device 10 may include one or more input/output (I/O) connectors (not shown) in the form electrical connectors for operatively connecting to another device (e.g., a computer) or an accessory via a cable, or for receiving power from an external power supply.

Another exemplary component is a vibrator 52 that is configured to vibrate the electronic device 10. Some notifications of events, such as incoming calls or messages, may include activating the vibrator.

Another exemplary component may be one or more cameras 54 for taking photographs or video, or for use in video telephony. As another example, a position data receiver 56, such as a global positioning system (GPS) receiver, may be present to assist in determining the location of the electronic device 10. The electronic device 10 also may include a subscriber identity module (SIM) card slot 58 in which a SIM card 60 is received. The slot 58 includes any appropriate connectors and interface hardware to establish an operative connection between the electronic device 10 and the SIM card 60.

Wireless Radio Communications Involving Listen Before Talk

Figure 3:
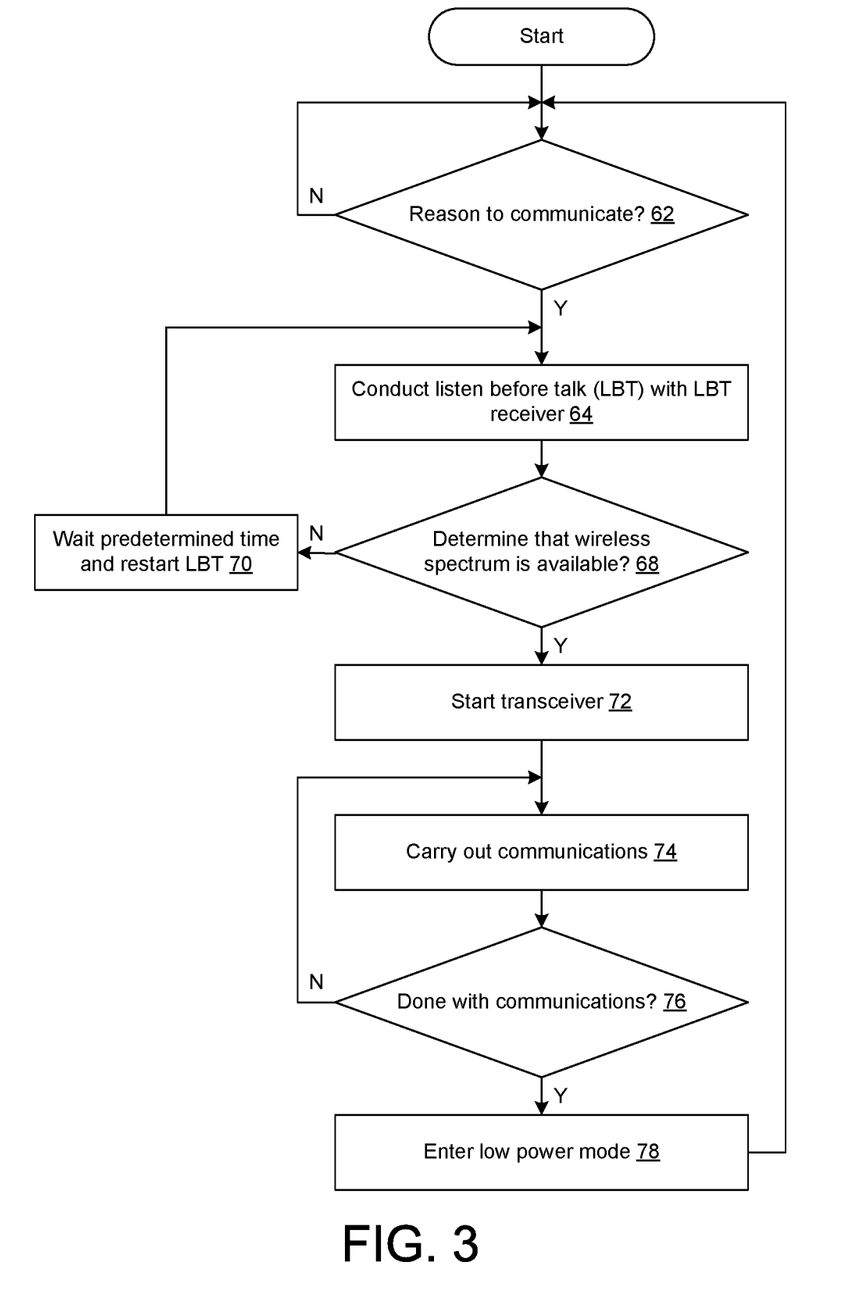
FIG. 3 is a flow-diagram of a representative method of conducting wireless radio communications with the electronic device.

With additional reference to FIG. 3, shown is an exemplary flow diagram representing steps that may be carried out by the electronic device 10 when executing logical instructions to carry out certain wireless radio communications. FIG. 3 illustrates an exemplary process flow representing steps that may be carried out by the electronic device 10 when executing the logical instructions to carry out the wireless radio communications. Complimentary operations of a device with which the electronic device 10 communicates will be understood from this disclosure. Although illustrated in a logical progression, the illustrated blocks of FIG. 3 may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 62. In block 62, the electronic device 10 makes a determination as to whether the electronic device 10 has a reason to initiate wireless radio communications with another device using a wireless radio interface that involves a listen before talk operation. In some circumstances, the listen before talk operation may be mandated by regulation, may be part of a communication protocol used by the electronic device 10, and/or may be directed by a network in which the electronic device 10 operates. In other circumstances, the listen before talk operation may be directed by the electronic device 10 itself to identify when wireless spectrum is clear of transmissions from other devices to improve delivery of signals transmitted by the electronic device 10.

There may be one or more reasons that the electronic device 10 will make a positive determination in block 62. For example, a positive determination may be made in block 62 if the electronic device 10 has data to transmit to another device. Another reason for a positive determination in block 62 is that the electronic device 10 has control signaling to communicate.

Upon making a positive determination in block 62, the logical flow may proceed to block 64. In block 64, the electronic device 10 conducts a listen before talk operation. The listen before talk operation is carried out with a listen before talk receiver 66 (FIG. 2). Prior to block 64, the listen before talk receiver 66 may be in an off state (e.g., unpowered) or may be in an idle state (e.g., sleep state or other low power mode in which reception of signals is not carried out and signal strength measurements are not made). As part of block 64, the listen before talk receiver 66 may be powered on and/or placed in an active mode, as is appropriate for operation of the listen before talk receiver 66.

In one embodiment, the listen before talk receiver 66 is a dedicated receiver that has its own hardware and logic implementing components. The listen before talk receiver 66 may have minimum components and/or logical capabilities to minimize power consumption. For instance, the listen before talk receiver 66 may have just the components and logical capabilities to carry out the listen before talk operation and does not have any other components and logical capabilities to carry out other functions. In an exemplary embodiment, the listen before talk receiver 66 has capabilities that are limited to one or both of signal strength measurement capability or preamble detection capability (e.g., an ability to detect a message or packet preamble of one or more predetermined formats). In this embodiment, the listen before talk receiver 66 does not have the capability to fully decode at least portions of messages, such as payload data transmitted at high data rate.

In another embodiment, the listen before talk receiver 66 is embodied as part of a receiver or as part of a transceiver (e.g., a radio access modem, such as one of the transceivers 26) that carries out other operations and that may include functionality to implement full wireless communication interfaces for conducting wireless radio communications. When the listen before talk receiver 66 is implemented as part of a receiver or a transceiver that carries out other operations, however, the receiver or transceiver limits its operations during listen before talk to reduce power consumption. For instance, the receiver or transceiver hosting the listen before talk operation (and thus serving as the listen before talk receiver 66) may only carry out functionality with minimum sufficiency to carry out the listen before talk operation. Therefore, during the listen before talk operation, the hosting receiver or transceiver cannot carry out any other radio functions. This may be accomplished by electronically and/or logically controlling parts of the hosting receiver or transceiver that are turned on, powered on, and/or enabled. In one embodiment, the listen before talk receiver 66 is part of a transceiver 26 and during the listen before talk operation, the transceiver 26 does not have transmission capability. In another embodiment, which may be combined with the embodiment of a transceiver 26 not having transmission capability in the listen before talk mode, the hosting receiver or transceiver does not have one or more receiver functions in the listen before talk mode that are normally available in one or more other modes, such as a wireless radio communications mode. For instance, the hosting receiver or transceiver may have capabilities that are limited to one or both of signal strength measurement capability during the listen before talk operation or predetermined preamble detection capability during the listen before talk operation (e.g., an ability to detect a message or packet preamble of one or more predetermined formats). In this embodiment, the listen before talk receiver 66 does not have the capability to fully decode at least portions messages, such as payload data transmitted at high data rate.

In one embodiment, the listen before talk receiver 66 is combined with a wake up receiver for the electronic device 10. Wake up receivers are used to detect when a corresponding transceiver 26 should be activated so that the electronic device 10 may receive in-bound signals. For this purpose, wake up receivers are configured to activate at designated times and listen for a predetermined signal. If the signal is detected, a corresponding transceiver 26 is activated. Due to the different purposes of the listen before talk receiver 66 and the wake up receiver, the wake up receiver may be reconfigured to conduct the described listen before talk operation when activated as a result of a positive determination in block 62.

In one embodiment, there is one listen before talk receiver 66 regardless of the number and configuration of the transceivers 26. In other embodiments, there is more than one listen before talk receiver 66 and each listen before talk receiver is configured to detect use of wireless spectrum associated with one or more of the transceivers 26.

Regardless of the configuration of the listen before talk receiver 66, the listen before talk receiver 66 consumes less electrical energy when listening to target wireless spectrum to determine the availability of the target wireless spectrum than the coordinating transceiver 26 would consume had the transceiver 26 carried out the same listen before talk actions.

In block 64, listen before talk is carried out by the listen before talk receiver 66. The listen before talk involves "listening" to a target segment of wireless spectrum, such as by passively receiving signals present on the wireless spectrum and/or detecting signal strength present on the wireless spectrum. The listen before talk may further involve analyzing received signals and/or detected signal strength to attempt to detect a condition on the target wireless spectrum. The target wireless spectrum may be defined, for example, by a predetermined channel number, an operational band, a start frequency and a stop frequency, a center frequency and bandwidth, or any other appropriate spectrum identification mechanism. The condition that the listen before talk attempts to detect is indicative of presence of a transmitter that is actively using the target wireless spectrum. In one embodiment, the condition monitored by the listen before talk is signal strength. In another embodiment, the condition monitored by the listen before talk is presence or absence of a message or data packet preamble having a predetermined configuration. In another embodiment, the conditioned monitored by the listen before talk is presence of predetermined signal or traffic type, such as a radar signal, machine-type communications, transmissions from a licensed transmitter, a beacon indicating channel unavailability, etc. The listening may last for a predetermined amount of time, such as might be required by regulation or to enhance operational performance.

In block 68, a determination is made as to whether the listen before talk carried out in block 64 detected the condition and, as a result, the target wireless spectrum is available or unavailable for wireless radio communications carried out by the associated transceiver 26. In one embodiment, the wireless spectrum is considered available (a positive determination in block 68) if the wireless spectrum is not occupied and the wireless spectrum is considered unavailable (a negative determination in block 68) if the wireless spectrum is occupied. For instance, in one embodiment, a determination is made that the target wireless spectrum is occupied if detected energy (e.g., signal strength) on the wireless spectrum is greater than a predetermined amount or unoccupied if detected energy is less than the predetermined amount. In another embodiment, a determination is made that the target wireless spectrum is occupied if a signal having a message or data packet preamble of predetermined configuration is present on the wireless spectrum or unoccupied if a signal having a message or data packet preamble of predetermined configuration is present on the wireless spectrum. In another embodiment, the wireless spectrum is considered occupied if both signal strength is greater than a predetermined amount and the predetermined preamble is present. Similar determinations may be made based on presence or absence of a predetermined signal or traffic type.

In other embodiments, the wireless spectrum may be occupied by radio transmissions of other devices, but still may be determined to be available under certain circumstances. For example, in television whitespaces, the electronic device 10 may proceed with wireless radio communications even if the target wireless spectrum (e.g., one of the channels that are unused by a licensed transmitter) is occupied. In this instance, the listen before talk is used to determine if the transmissions of other devices would, as a matter of policy, indicate to the electronic device 10 that it should not use the target wireless spectrum. One exemplary reason to not use the target wireless spectrum in the presence of transmissions from other devices is that the transmissions are likely to cause interference to receipt of transmissions made by the electronic device 10. Another exemplary reason to not use the target wireless spectrum in the presence of transmissions from other devices is if the transmissions are made by higher priority transmitters than the electronic device 10.

If a negative determination is made in block 68, the logical flow may proceed to block 70. In one embodiment, block 70 includes waiting a predetermined amount of time and then the logical flow returns to block 64 to conduct another listen before talk of the target wireless spectrum.

The predetermined amount of time may be zero seconds (e.g., there is no waiting so that block 70 is omitted from the logical flow) to about three seconds, although longer wait times are possible. Typical wait times may be about one millisecond to about 500 milliseconds. During the delay introduced by the predetermined amount of time, the listen before talk receiver 66 may continue to passively receive signals or may make signal strength measurements. Alternatively, to conserve power, the listen before talk receiver 66 may be placed in an idle mode during the delay introduced by the predetermined amount of time. Also, the predetermined amount of time may differ during various iterations of the delay introduced in block 70. For instance, the delay that is introduced in block 70 may be increased by a predetermined amount of time for each successive negative determination in block 68.

Other possible operations in block 70 include changing the target wireless spectrum of the listen before talk and/or waking up additional functionality of the listen before talk receiver 66 to detect additional information about the signals present on the target wireless spectrum.

If a positive determination is made in block 68, the logical flow may proceed to block 72. In block 72, the appropriate transceiver 26 is activated. Prior to block 72, the transceiver 26 may be in an off state (e.g., unpowered), may be in an idle state (e.g., sleep state or other low power mode in which reception or transmission of signals is not carried out), or may be in a wake-up receiver state for detection of a wake-up signal directed to the electronic device 10. As part of block 72, the transceiver 26 may be powered on and/or placed in an active mode, as is appropriate for operation of the transceiver 26 to conduct wireless radio communications, such as transmitting and/or receiving data, sending and/or receiving control signaling, etc.

Also in block 72, the listen before talk receiver 66 may be returned to the state (e.g., off state or idle state) that the listen before talk receiver 66 was in prior to block 64. This may be omitted or partially carried out if the listen before talk receiver 66 is affiliated with receive operations of the transceiver 26 carried out in block 74.

Proceeding to block 74, the electronic device 10 may carry out the wireless radio communications. The wireless radio communications are carried out with the transceiver 26 over an appropriate wireless radio interface that is established using the wireless spectrum found available using the listen before talk techniques described above. In block 76, a determination is made as to whether the wireless radio communications are complete. If not, the transceiver 26 may remain in its operational mode and continue to conduct the wireless radio communications. If the wireless radio communications are complete, the logical flow may proceed to block 78. In block 78, the transceiver 26 may be placed in a low power mode. For instance, the transceiver 26 may be returned to the off state, to the idle state or to the wake-up receiver state that it was in prior to block 72. Thereafter, the logical flow may return to block 62.

Figure 4:
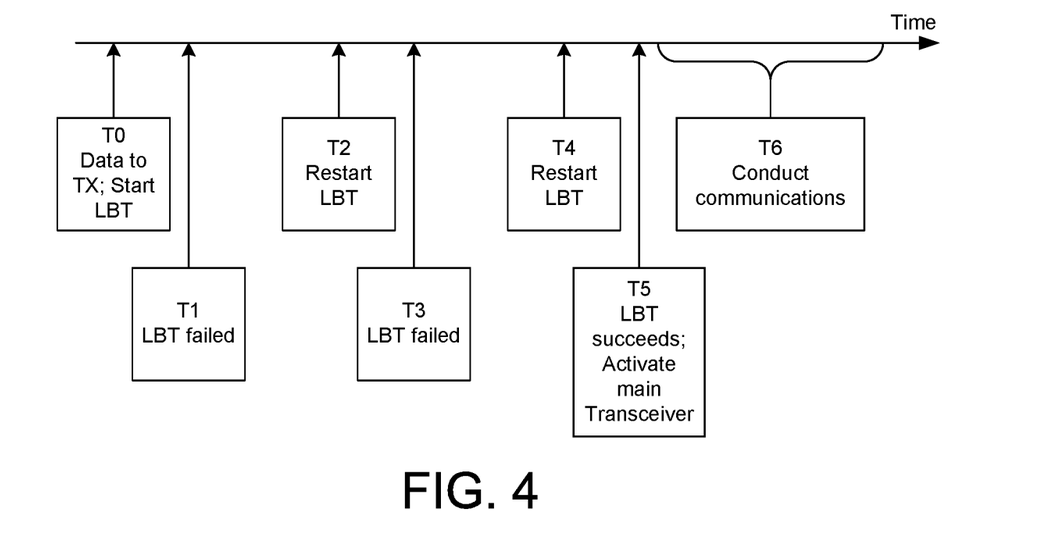
FIG. 4 is a representative timeline showing possible events that may occur in connection with the method of conducting wireless radio communications with the electronic device.

With additional reference to FIG. 4, illustrated is a representative timeline in which possible events that may occur in connection with the method of conducting wireless radio communications with the electronic device 10 are shown. In this exemplary sequence of events, a determination is made at an initial time mark (T0) that the electronic device 10 has a reason to carry out wireless radio communications (e.g., a positive determination in block 62). Upon making this determination, the listen before talk of block 64 is carried out. At the next time mark (T1), it is determined that the listen before talk "fails", which may correspond to a negative determination in block 68 due to detection of the target wireless spectrum being occupied.

Immediately after such a "failure" of the listen before talk, or after a predetermined delay of block 70, the listen before talk is carried out again starting at time mark T2. At time mark T3, the second instance of the listen before talk is determined to fail. At time mark T4, the listen before talk is carried out again and, at time mark T5, a determination is made that the target wireless spectrum is available (e.g., the listen before talk "succeeds"). At this point, the transceiver 26 is activated and, at time mark T6, the wireless radio communications are carried out.

As indicated, the electronic device 10 may have multiple transceivers 26, labeled Transceiver_1 to Transceiver_N in FIG. 2, and/or the electronic device 10 may support wireless radio communications using multiple radio access technologies. In some instances, upon a positive determination in block 62 that the electronic device 10 has a reason to carry out communications, a particular one of the transceivers 26 and/or radio access technology may be appropriate for the wireless radio communications. In this case, the listen before talk is carried out for wireless spectrum that is appropriate for wireless radio communications of the transceiver 26 and/or radio access technology in question.

In other instances, more than one transceiver 26 and/or radio access technology may be appropriate for the wireless radio communications. In some cases, the wireless spectrum that would be used by the different transceivers 26 or radio access technologies is different and a listen before talk may be carried out for each appropriate wireless spectrum. In other cases, the wireless spectrum that would be used by the difference transceivers 26 or radio access technologies is the same, but the condition determining availability is different. In either case, listen before talk may be performed for each appropriate wireless spectrum and/or each condition. This may result in detection of more than one target wireless spectrum that may be used. If this occurs, the transceiver 26 associated with the first one of any of the listen before talk routines that detects available wireless spectrum is the transceiver 26 that is activated and used to carry out the wireless communications. In another embodiment, the transceiver 26 associated with a highest priority one of any of the listen before talk routines that detects available wireless spectrum is the transceiver 26 that is activated and used to carry out the wireless communications.

Conclusion

Although certain embodiments have been shown and described, it is understood that equivalents and modifications falling within the scope of the appended claims will occur to others who are skilled in the art upon the reading and understanding of this specification.

What is claimed is:

1. A method of carrying out wireless radio communications with an electronic device, comprising:
   determining that the electronic device has a reason to communicate over a wireless radio interface;
   conducting listen before talk with a dedicated listen before talk receiver for plural wireless spectrum segments in response to the determining that the electronic device has the reason to communicate over the wireless radio interface;
   determining, through the listen before talk, two or more wireless spectrum segments for the wireless radio interface that are available for conducting the wireless radio communications and tracking which of the two or more available wireless spectrum segments is first in time to be determined as available; and
   in response to the determining of the two or more available wireless spectrum segments based on the listen before talk carried out with the dedicated listen before talk receiver, selecting a radio access transceiver associated with the wireless spectrum segment that is the first in time to be determined as available and carrying out the wireless radio communications over the wireless radio interface with the selected radio access transceiver and the wireless spectrum segment first determined as available.

2. The method according to claim 1, wherein the conducting the listen before talk includes activating the listen before talk receiver from an off or idle state.

3. The method according to claim 1, wherein listen before talk is carried out for each of multiple radio access technologies, and wherein the electronic device comprises multiple radio access transceivers, each radio access transceiver configured to conduct communications respectively under one or more of the radio access technologies.

4. The method according to claim 1, wherein selecting the radio access transceiver includes powering on the radio access transceiver or placing the radio access transceiver in an active mode.

5. The method according to claim 1, wherein during the listen before talk operation, the radio access transceiver does not have transmission capability.

6. The method according to claim 1, wherein the radio access transceiver is configured to conduct wireless radio communications according to a radio access technology corresponding to the wireless radio communications over the wireless radio interface.

7. The method according to claim 6, wherein the listen before talk receiver does not have capability to fully decode at least portions of messages.

8. The method according to claim 6, wherein the listen before talk receiver does not have capability to decode payload data.

9. The method according to claim 6, wherein the listen before talk receiver has capabilities that are limited to one or both of signal strength measurement capability or preamble detection capability.

10. The method according to claim 6, wherein the listen before talk receiver has its own hardware and logic implementing components, which do not include components or logic other than that to carry out the listen before talk operation.

11. The method according to claim 1, wherein the wireless spectrum segment is available for conducting the wireless radio communications if a signal strength of the wireless spectrum segment, measured by the dedicated listen before talk receiver, is less than a predetermined threshold.

12. An electronic device configured to carry out wireless radio communications, comprising:
   a dedicated listen before talk receiver;
   at least one radio access transceiver that carries out the wireless radio communications; and
   a controller configured to:
      determine that the electronic device has a reason to communicate over a wireless radio interface;
      conduct listen before talk with the listen before talk receiver for plural wireless spectrum segments in response to the determining that the electronic device has the reason to communicate over the wireless radio interface;

determine, through the listen before talk, two or more wireless spectrum segments for the wireless radio interface that are available for conducting the wireless radio communications and tracking which of the two or more available wireless spectrum segments is first in time to be determined as available; and in response to the determining of the two or more available wireless spectrum segments based on the listen before talk carried out with the dedicated listen before talk receiver, identify the wireless spectrum segment of the two or more available wireless spectrum segments that is the first in time to be determined as available and select a radio access transceiver of the at least two radio access transceivers that is associated with the wireless spectrum segment that is the first in time to be determined as available and carry out the wireless radio communications over the wireless radio interface with the selected radio access transceiver and the wireless spectrum segment first determined as available.

13. The electronic device according to claim 12, wherein the at least one radio access transceiver is configured to conduct wireless radio communications according to a radio access technology corresponding to the wireless radio communications over the wireless radio interface.

14. The electronic device according to claim 13, wherein the listen before talk receiver does not have capability to fully decode at least portions of messages.

15. The electronic device according to claim 13, wherein the listen before talk receiver does not have capability to decode payload data.

16. The electronic device according to claim 13, wherein the listen before talk receiver has capabilities that are limited to one or both of signal strength measurement capability or preamble detection capability.

17. The electronic device according to claim 13, wherein the listen before talk receiver has its own hardware and logic implementing components, which do not include components or logic other than that to carry out the listen before talk operation.

18. The electronic device according to claim 12, wherein during the listen before talk operation, the at least one radio access transceiver does not have transmission capability.

19. The method according to claim 12, wherein the wireless spectrum segment is available for conducting the wireless radio communications if a signal strength of the wireless spectrum segment, measured by the dedicated listen before talk receiver, is less than a predetermined threshold.

* * * * *